(12) United States Patent
Dries

(10) Patent No.: US 6,740,864 B1
(45) Date of Patent: May 25, 2004

(54) METHOD AND APPARATUS FOR MONITORING OPTICAL SWITCHES AND CROSS-CONNECTS

(75) Inventor: J. Christopher Dries, Skillman, NJ (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/136,570

(22) Filed: Apr. 30, 2002

(51) Int. Cl.[7] .................................................. G01J 1/04
(52) U.S. Cl. .............. 250/227.11; 250/216; 250/227.22
(58) Field of Search ................................ 250/216, 221, 250/227.22, 227.21, 227.24, 353, 227.11; 200/61.02; 359/244, 245, 359, 583, 839; 385/16, 17, 18, 19–23

(56) References Cited

U.S. PATENT DOCUMENTS

| | | | | |
|---|---|---|---|---|
| 5,090,791 A | * | 2/1992 | Kidder et al. ................. | 385/18 |
| 5,317,439 A | | 5/1994 | Fatehi et al. ................. | 359/110 |
| 5,734,764 A | | 3/1998 | Bozso et al. .................. | 385/17 |
| 5,978,527 A | | 11/1999 | Donald ......................... | 385/17 |
| 5,998,906 A | | 12/1999 | Jerman et al. ............... | 310/309 |
| 6,243,507 B1 | * | 6/2001 | Goldstein et al. ............. | 385/13 |
| 6,477,291 B1 | * | 11/2002 | Ramadas ...................... | 385/17 |
| 6,549,692 B1 | * | 4/2003 | Harel et al. .................... | 385/18 |
| 6,567,574 B1 | * | 5/2003 | Ma et al. ....................... | 385/16 |
| 2003/0026524 A1 | * | 2/2003 | Kakizaki et al. .............. | 385/16 |

FOREIGN PATENT DOCUMENTS

| | | |
|---|---|---|
| JP | 57195202 | 11/1982 |
| JP | 61223816 | 10/1986 |

* cited by examiner

*Primary Examiner*—Que T. Le
*Assistant Examiner*—Eric J Spears
(74) *Attorney, Agent, or Firm*—Workman Nydegger

(57) ABSTRACT

A method and apparatus for monitoring MEMS-based optical switches and cross-connects. A plurality of partial reflectors are introduced into optical paths of the switch for reflecting light transmitted along the optical paths through a transparent substrate of the switch, without disturbing transmission of the light along the optical paths. The reflected light is transmitted through the substrate, which is preferably made of silicon and transparent to wavelengths of light used in DWDM systems. A photodetector array bonded to the underside of the substrate detects the light reflected by the plurality of partial reflectors through the substrate. The light detected by the photodetector array indicates the switching states and functionality of the switch, and can be processed by circuitry associated with the array.

13 Claims, 3 Drawing Sheets

METHOD AND APPARATUS FOR MONITORING OPTICAL SWITCHES AND CROSS-CONNECTS

BACKGROUND OF THE INVENTION

1. Field of the Invention

The present invention relates to a method and apparatus for monitoring optical switches, and more specifically, to a method and apparatus for monitoring micro-electro-mechanical ("MEMS") optical switches and cross-connects using a photodetector array.

2. Related Art

Fiber optic technology has dramatically increased the quantity of data that can be carried across various network topologies, including local area networks ("LANs"), metropolitan area networks ("MANs"), and wide area networks ("WANs"). Dense wavelength division multiplexing ("DWDM") allows for the transmission of multiple wavelengths of light along a single fiber optic strand, so that large quantities of data can be multiplexed over the multiple wavelengths and transmitted over the single strand. Optical switches and cross-connects allow data transmitted over a fiber-optic network to be optically switched across multiple pairs of fiber optic cables, without requiring conversion of the optical signals to electric signals. In MEMS-based systems, arrays of microfabricated mirrors are controlled electromechanically to switch light from one or more source optical fibers to one or more destination optical fibers.

While current MEMS-based systems can be used for channel routing in optical switches, cross-connects, and other devices, there presently is lacking a means for passively monitoring the switching state and functionality of such devices. Present monitoring systems require the introduction of additional equipment in existing optical networks, and frequently require the disruption of data flowing through the switch or cross-connect to allow monitoring and/or analysis thereof. For example, in order to determine a fault in an optical switch using current monitoring systems, a transponder is required at one end of the switch to send information back to the data source.

It is known in the art to apply photodetectors to a substrate for the purpose of monitoring activity of a MEMS-based switch. However, such an approach is inefficient, because it requires the addition of circuitry to the switch substrate, thereby reducing the capacity and overall compactness of the switch. Accordingly, what would be desirable, but has not yet been provided, is a method and apparatus for monitoring MEMS-based optical switches and cross-connects.

OBJECTS AND SUMMARY OF THE INVENTION

It is an object of the present invention to provide a method and apparatus for monitoring optical switches and cross-connects using a photodetector array.

It is a further object of the present invention to provide a method and apparatus for monitoring optical switches and cross-connects using a photodetector array attached to a substrate of the switch.

It is another object of the present invention to provide a method and apparatus for monitoring optical switches and cross-connects using a plurality of partial reflectors in the switch to reflect a portion of light transmitted through the switch to a photodetector array.

It is yet another object of the present invention to provide a method and apparatus for monitoring optical switches and cross-connects using a plurality of partial reflectors in the switch to reflect a portion of light through a substrate of the switch to a photodetector array interconnected with the substrate of the switch.

The present invention relates to a method and apparatus for monitoring optical switches and cross-connects, such as MEMS-based optical switches and cross-connects. A plurality of partial reflectors are provided along the optical paths of a switch and associated with one or more switching mirrors to partially reflect a portion of light switched by the mirrors to a photodetector array. The light sensed by the array can be used to passively monitor switching states and/or functionality of the switch without disrupting operation thereof.

In an embodiment of the invention, the photodetector array is bonded to the substrate of the switch using indium bump bonding, solder bonding, epoxy bonding, or other hybridization technique known in the art. A plurality of partial reflectors reflect a portion of light switched by one or more mirrors of the switch through the switch substrate and to the photodetector array for sensing thereby. Processing circuitry can be hybridized to the photodetector array, allowing for on-chip amplification, signal processing, data reception, and recovery functions.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The present invention relates to a method and apparatus for monitoring optical switches and cross-connects, such as MEMS-based optical switches and cross-connects. A plurality of partial reflectors are positioned along optical paths of the switch and associated with one or more switching mirrors to reflect a portion of the light switched by the mirrors to a photodetector array. The partial reflectors can reflect part of the light through a substrate of the switch to the photodetector array, where the substrate is transparent to wavelengths of light utilized by DWDM optical systems. The photodetector array can be mounted to the underside of the substrate for receiving light reflected therethrough by the partial reflectors, allowing for monitoring of the switch.

Figure 1:
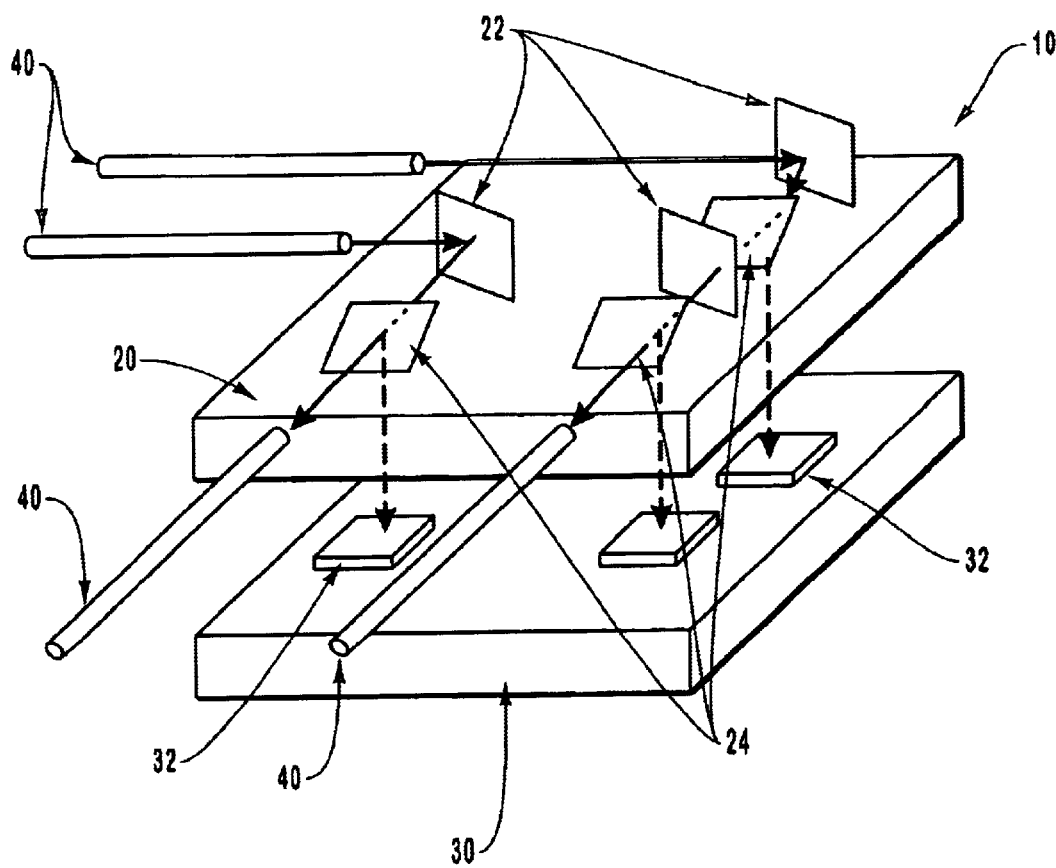
FIG. 1 is a perspective view of the switch and monitoring apparatus of the present invention.

FIG. 1 is a perspective view of an optical cross-connect or switch with the monitoring apparatus of the present invention. Switch 10, connected to optical fibers 40, allows light waves to be switched between the fibers. Switch 10 includes a silicon substrate 20 which is naturally transparent to light waves having wavelengths of approximately 0.9 to 1.7 micrometers (i.e., near-infrared light), or S, C, and L band wavelengths of light that are utilized by DWDM optical systems.

Switch 10 includes a plurality of mirrors 22 which selectively switch light between the optical fibers 40. Mirrors 22 can be fabricated using MEMS-based fabrication or other techniques known in the art, and can be controlled electromechanically or as is otherwise known in the art. The construction of such optical switches is known. Positioned between mirrors 22 and destination fibers 40 are partial reflectors 24. Partial reflectors 24 reflect a portion of the light switched by mirrors 22 to a photodetector array, without noticeably disturbing transmission of the switched light to the destination fibers. The partially reflected light is detected by the photodetectors 32 of photodetector array 30.

In a preferred embodiment of the invention, photodetector array 30 comprises an Indium Gallium Arsenide (InGaAs) photodiode array. The photodetector array 30 can be bonded to the underside of substrate 20, using known bonding techniques such as indium bump bonding, solder bumping, epoxy bonding, flip bonding, wafer fusion, or other technique known in the art. Photodetector array 30 may be designed to receive light from the monitoring points of a MEMS switch.

Importantly, the reflected light received by photodetector array 30 can be utilized to determine the switch states and/or functionality of switch 10. Further, read-out integrated circuitry can be bonded and/or hybridized to the underside of photodetector array 30, allowing for on-chip amplification, signal processing, data reception and recovery functions. Thus, a network administrator or other personnel can quickly determine the operational characteristics of the optical switch or cross-connect according to the present invention, without requiring the addition of monitoring equipment to the switch and/or disruption of data flowing through same.

Additionally, the photodetector array of the present invention allows for the reception of data transmitted through a switch or cross-connect, thus providing a tap point for an optical network in which the present invention is incorporated. The photodiode array and partial reflectors of the present invention can be incorporated into existing MEMS-based switches, such as the LambdaRouter switch manufactured by Lucent Technologies, Inc.

Figure 2:
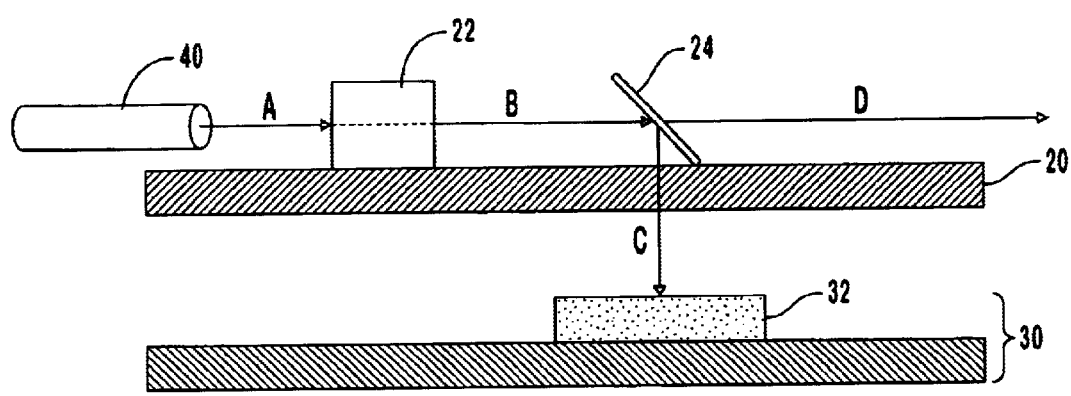
FIG. 2 is a side view of the apparatus of FIG. 1, shown in greater detail.

FIG. 2 is a side view of the apparatus of FIG. 1, shown in greater detail. The partial reflectors 24 of the present invention are positioned between mirrors 22 and destination fibers or outputs of the switch, and partially reflect light through substrate 20. A light beam emanating from optical fiber 40, or other light source, travels along path A, until it is reflected (i.e., switched) by mirror 22. Then, the beam travels along path B, whereupon a portion of the beam is partially reflected through substrate 20 by partial reflector 24. The reflected light travelling along path C is then detected by photodetector 32 of photodetector array 30. The remainder of the light beam travelling along path B is transmitted through partial reflector 24, and continues along path D for subsequent switching, reflection, or transmission.

Figure 3:
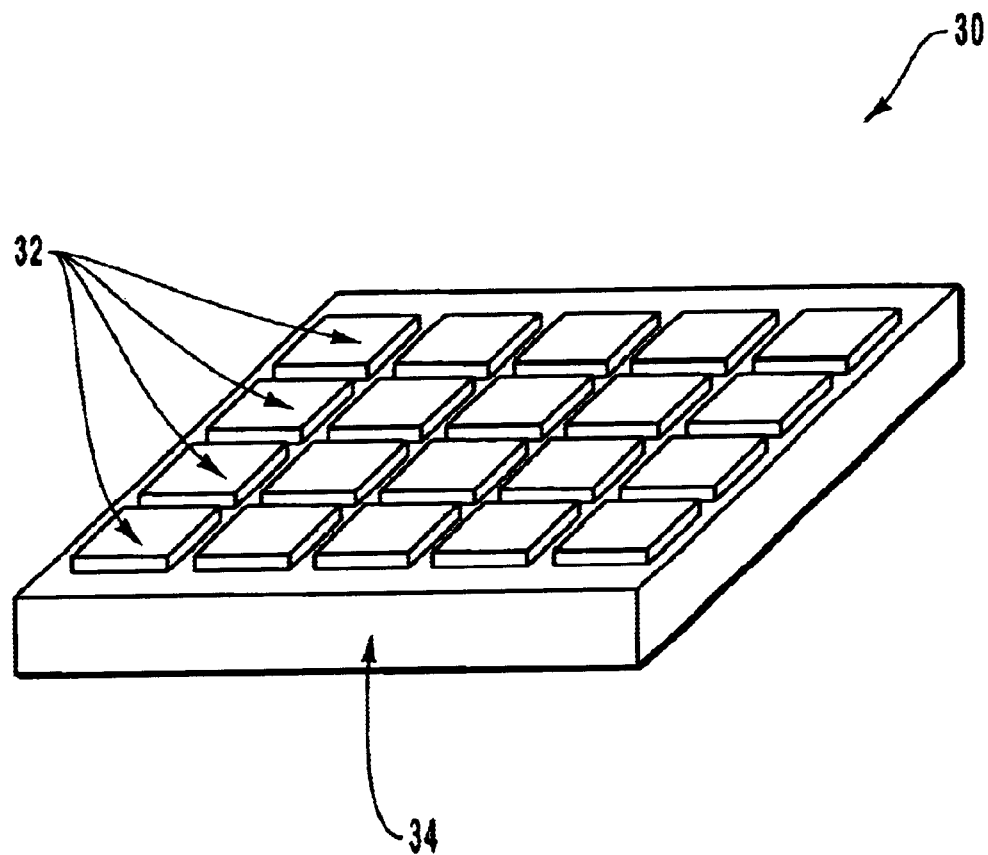
FIG. 3 is a perspective view of a photodetector array according to the present invention.

FIG. 3 is a perspective view of the photodetector array 30 of the present invention. A plurality of photodetectors 32 can be positioned along substrate 34 to form a photodetector array having high resolution. Photodetectors 32 can be InGaAs photodiodes, phototransistors, or other light sensing components known in the art, and can be formed by photolithography or other known technique. In a preferred embodiment of the present invention, photodetector array 30 is designed to receive light from the monitoring of a MEMS switch.

Having thus described the invention in detail, it is to be understood that the foregoing description is not intended to limit the spirit and scope thereof. What is desired to be protected by Letters Patent is set forth in the appended claims.

What is claimed is:

1. In a fiber optic transmission system that includes a plurality of inputs, outputs, and mirror switches that are selectively moveable between switched and unswitched positions in order to selectively reflect light from one or more inputs toward one or more desired outputs, an apparatus for passively monitoring whether the mirror switches are in a switched or unswitched position without significantly disrupting data transmission between the inputs and outputs comprising:

a switch substrate including a first surface on which the mirror switches are disposed;

a plurality of partial reflectors, disposed on the first surface of the switch substrate and positioned between the mirror switches and the outputs, for reflecting a portion of light reflected by one or more of the mirror switches when in a switched position, while allowing a portion of the light to pass therethrough toward one or more desired outputs; and a photodetector array, not attached to the first surface of the switch substrate, for sensing the portion of light reflected by the partial reflectors when one or more of the mirror switches are in the switched position, wherein light detected by a photodetector of the photodetector array indicates that a corresponding mirror switch is in a switched position relative to a desired output, and failure of the photodetector to detect light indicates that the corresponding mirror switch is not in the switched position relative to the desired output.

2. The apparatus of claim 1, wherein the photodetector array comprises InGaAs photodiodes.

3. The apparatus of claim 1, wherein the photodetector array senses near-infrared light.

4. The apparatus of claim 1, wherein the photodetector array is positioned so as to face a side of the switch substrate opposite the first side to which the mirror switches and partial reflectors are attached such that light reflected by the partial reflectors passes through the switch substrate before reaching the photodetector array.

5. The apparatus of claim 1, the apparatus comprising a plurality of partial reflectors positioned so as to alternatively reflect a portion of light emitted by particular input.

6. The apparatus of claim 5, wherein when one of the partially reflective mirrors reflects a portion of the light emitted by the particular input, it indicates that a first mirror switch is in the switched position relative to a first desired output, and when another of the partially reflective mirrors reflects a portion of the light emitted by the particular input it indicates that a second mirror switch is in the switched position relative to a second desired output.

7. The apparatus of claim 1, the photodetector array comprising a separate photodetector corresponding to each partially reflective mirror of the apparatus.

8. An optical switch for passively monitoring an optical switch within a fiber optic transmission system that includes one or more inputs and one or more outputs without significantly disrupting data transmission between the inputs and outputs, the optical switch comprising:

a switch substrate;

at least one mirror switch disposed on a first surface of the switch substrate for switching light between an input and a desired output of the fiber optic transmission system, wherein light is reflected from the input toward the desired output when the mirror switch is in a switched position;

at least one partial reflector disposed on the first surface of the switch substrate and positioned between the mirror switch and the desired output so as to reflect a portion of the light reflected by the mirror switch when in the switched position, while allowing a portion of the light to pass therethrough toward the desired output, the portion of light reflected by the partial reflector being reflected through the switch substrate; and at least one photodetector, positioned so as to face a second side of the switch substrate opposite the first side, for sensing the portion of the light reflected by the partial reflector through the substrate when the mirror switch is in the switched position, wherein:

light detected by the photodetector indicates that the mirror switch is in the switched position, and failure of the photodetector to detect light indicates that the mirror switch is not in the switched position.

9. The optical switch of claim 8, wherein the photodetector comprises an InGaAs photodiode array.

10. The optical switch of claim 8, wherein the photodetector senses light having wavelengths of approximately 0.9 to 1.7 microns.

11. The optical switch of claim 8, a plurality of mirror switches being positioned so as to alternatively reflect light emitted by a particular input toward desired alternative outputs.

12. The optical switch of claim 5, the optical switch comprising a plurality of partially reflective mirrors positioned so as to alternatively reflect a portion of the light emitted by the particular input depending on which of the plurality of mirror switches is in the switched position relative to a desired alternative output.

13. The optical switch of claim 12, further comprising a photodetector array comprising separate photodetectors corresponding to each partially reflective mirror of the optical switch.

* * * * *